Figures 1, 2:
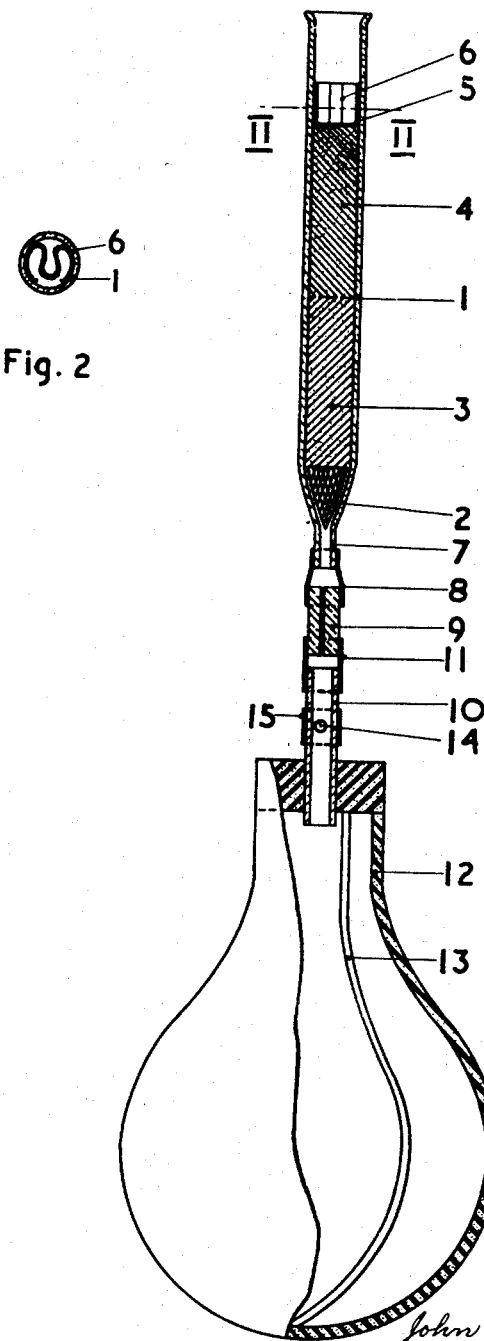

Oct. 2, 1951     J. D. MAIN-SMITH ET AL     2,569,895
DETECTION OF CARBON MONOXIDE BY PALLADOUS
SULFITE AND/OR PALLADOSULFITES
Filed March 8, 1945

Inventors
John David Main-Smith
George Alan Earwicker
By
Loyd Hall Sutton
Attorney Patented Oct. 2, 1951

2,569,895

UNITED STATES PATENT OFFICE 2,569,895
DETECTION OF CARBON MONOXIDE BY PALLADOUS SULFITE AND/OR PALLADOSULFITES

John David Main-Smith and George Alan Earwicker, Farnborough, England, assignors to Minister of Supply, in His Majesty's Government of the United Kingdom of Great Britain and Northern Ireland, London, England Application March 8, 1945, Serial No. 581,618
In Great Britain July 12, 1943

Section 1, Public Law 690, August 8, 1946
Patent expires July 12, 1963

6 Claims. (Cl. 23—232)

The invention relates to the detection and/or quantitative determination of carbon monoxide in admixture with air or other gases.

The invention provides a simple, convenient, and rapid means of effecting such detection or determination over a wide range of atmospheric temperatures in small volumes of air or other gases containing carbon monoxide in concentrations as low as one part of carbon monoxide per million parts of air or other gas and in higher concentrations.

The invention is based on the discovery that the simple or complex sulphites of palladium, or mixtures containing the palladous and sulphite ions, undergo colour changes in the presence of carbon monoxide. Most of the compounds mentioned above are believed to be novel per se.

The property of undergoing colour change is exhibited by the isolated compounds, but for the best results they are made into preparations by depositing them upon carrier substances.

A feature of the invention is a reagent for the detection of carbon monoxide comprising a simple or complex sulphite of palladium or a mixture containing the palladous and sulphite radicals deposited on a carrier.

A further feature of the invention is the manufacture of such reagents by admixing the active ingredient, preferably in aqueous solution, with a carrier. A palladosulphite is preferred as the active ingredient and silica gel forms a convenient carrier. As used herein, the term "palladosulphite" means a compound of the general formula $M_2(Pd(SO_3)_2)_n$ where M represents a metal having a valency of $n$, it being understood that "pallado" and "palladous" are equivalent expressions meaning bivalent palladium.

The manufacture of palladous sulphite and of palladosulphites forms a further feature of the invention. Palladous sulphite may be made by reaction in aqueous medium between a palladous salt and the sulphite of another metal such that an insoluble metallic salt is formed, as, for example, by the formation of insoluble silver chloride and soluble palladous sulphite from palladous chloride and silver sulphite. An alternative method of manufacture is by reaction in aqueous medium between palladium hydroxide and sulphur dioxide.

Palladosulphites may be made by reaction in aqueous medium between palladous sulphite and the sulphite of another metal or between a palladous salt other than the sulphite and a pyrosulphite or between a palladous salt other than the sulphite and a sulphite.

Detection or quantitative determination of the carbon monoxide may be effected by locating the reagent in a container having a wall through which said reagent is visible and having an inlet and an outlet for the gases to be investigated. Such apparatus may be used quantitatively either by drawing gas through the container at a given rate and noting the time taken for perceptible colour change of the reagent to reach a standard distance along the reagent or by drawing a standard quantity of gas through the container and noting the length of the column of reagent in which a perceptible colour change has occurred.

The invention is suitable for detection or estimation of carbon monoxide at any atmospheric temperature or pressure in any atmosphere in which carbon monoxide would be harmful, such as the interior of vehicles or aircraft, or closed spaces or industrial premises where carbon monoxide contamination is likely to occur, or may be used as a method of test in industrial processes involving chemical reactions accompanied by the evolution of carbon monoxide.

The water contents of the reagents may be varied over a wide range, but for the best results a water content of 15% is preferred.

In carrying out the invention, aqueous solutions of simple or complex sulphites of palladium, with or without other chemical substances, are preferably impregnated on white or colourless, relatively inert, absorbent material such as dry, activated silica gel. Other absorbent materials having a granular, fibrous or porous structure such as alumina gel, titania gel, porous earthenware, glass, cellulose and its derivatives, asbestos, pumice, and the like, having a relatively large specific surface, may be used but are in general less suitable than silica gel. After partial dehydration, a yellow indicator material is obtained, the colour intensity depending on the content of palladium salt and moisture. This indicator material, when exposed to air or other gases containing carbon monoxide, undergoes colour change from yellow to sepia brown, the intensity of the colour change depending on the original content of palladium salt and moisture and on the concentration of carbon monoxide, length of time of and temperature during exposure.

At temperatures below about —45° C., carbon monoxide is absorbed by the indicator material without change in colour. On allowing the temperature to rise above about —40° C., the indicator material rapidly changes from yellow to sepia brown, precisely similar in shade and intensity to the colour instantly developed when exposure to carbon monoxide is effected at higher temperatures. The reaction of carbon monoxide with palladium sulphite or its double salts is probably due to the initial synthesis of a palladium carbonyl sulphite stable at low temperatures, but decomposing at higher temperatures with oxidation of carbon monoxide to carbon dioxide and reduction of palladium sulphite to sulphur dioxide and metallic palladium. The metal deposited in the indicator material is sufficiently finely divided to have an amethyst colour on individual granules, though the bulk colour may be shades of sepia brown, due to varying combinations of amethyst colour mixed with or superimposed on the original yellow colour of unreacted material.

The simple salt palladium sulphite, $PdSO_3$, is difficult to isolate in purity except in small quantities, but its characteristic property of rapid colour-change reaction with carbon monoxide is retained in the much more readily accessible double salts with sulphites of the alkalis and alkaline earths, and in complex salts and mixtures containing the palladous and sulphite radicals. For example, indicator material made from the complex salt obtained in the reactions between potassium iodate and palladous sulphite shows reactivity with carbon monoxide similar to that of the indicator material made by the admixture of potassium iodate, potassium sulphite and palladous chloride, or the admixture of potassium iodate and double sulphites of palladium.

The most generally useful palladous compound, for the preparation of indicator material highly reactive with carbon monoxide even at very low temperatures, is the double sulphite, potassium palladosulphite (dipotassium palladous disulphite, $K_2Pd(SO_3)_2$).

Potassium palladosulphite is readily prepared from palladous salts in acid media through the intervention of potassium pyrosulphite, or in neutral or alkaline media using potassium sulphite. Suitable palladium salts for use in the preparation are palladous chloride and palladous sulphate, the chloride being more generally completely reactive with potassium pyrosulphite.

The following is a typical example of the preparation of potassium palladosulphite and its impregnation on silica gel to form indicator material.

To 10 grams of palladous chloride are added 25 grams of potassium pyrosulphite in solution in 100 millilitres of cold distilled water, the mixture being stirred till solution is complete. The yellow solution is evaporated on a boiling-water bath until reduced to about one-third of the original volume, a bright yellow solid slowly separating. After cooling, the yellow solid is removed by filtration, and washed with cold distilled water, and then dried at reduced pressure. About 16 grams, 80 per cent. of the theoretical yield of anhydrous potassium palladosulphite, is usually obtained as a free-flowing, canary-yellow, crystalline powder.

The silica gel used for impregnation should be a good quality, commercial white gel. A convenient form of gel is in granules of size to pass a sieve having square meshes about $1/40$ inch in length of side of aperture, and to be retained on a similar sieve about $1/80$ inch in length of side of aperture. To remove impurities likely to interfere with the efficiency of the indicator material, the gel is purified by heating with concentrated nitric acid, washing with distilled water till substantially free from acid, and drying for about 6 hours at 270°–280° C. To the dried purified gel, when cool, is added 15 per cent. by weight of distilled water, and the gel allowed to stand in a closed glass vessel for about 2 days to allow the water to become uniformly distributed throughout the gel, which should be obtained as free-flowing, apparently dry, white granules.

The impregnating solution is made by dissolving 1.62 grams of potassium palladosulphite in 200 millilitres of boiling distilled water. The cold solution is added to 500 grams of purified silica gel containing 15 per cent. of added water, and the mass gently shaken until wetted throughout and uniformly yellow. The operation is best carried out in a weighed 3-litre, stoppered, bolt-head flask fitted with a stop-cock for connection to a vacuum pump via a train of drying towers. The pressure in the flask is reduced to about a two-hundredth of an atmosphere and its temperature raised to about 50° C. in a water-bath. During the early stages of drying, the flask is frequently shaken to prevent the impregnating solution draining to the bottom, but, after the gel is dry enough to be free-flowing, the flask is only occasionally shaken to expose a fresh surface. The drying is continued till the weight is reduced to the same as the original weight of flask and unimpregnated gel, the final net weight of the gel being 500 grams, thus containing about 15 per cent. of moisture. Care must be exercised throughout the preparation to ensure that the gel at no stage becomes contaminated with dust, organic matter, or other impurities. The indicator material so prepared consists of uniformly yellow granules, which should be stored in sealed bottles till required for use.

The detection and quantitative determination of carbon monoxide in air or other gases, is effected by exposing the indicator material under suitably controlled conditions to the air or other gases to be tested, and these conditions can readily be arranged so that an accurate quantitative analysis can be made by an operator without scientific knowledge or skill. To this end, the indicator material is mounted as a column in a glass tube of uniform bore and attached to a suitable device such as a deflated rubber bulb with suitable throttle, by which the air or gas to be tested can be passed through the indicator tube in a fixed amount at a fixed rate, the amount of carbon monoxide being ascertained from the measurement of the length of the band of colour-change in the indicator tube and reference to a chart or other record showing the lengths of band appropriate to various concentrations of carbon monoxide, determined by calibration tests on similar tubes similarly exposed to known concentrations of carbon monoxide.

For indicator material as above described, suitable amounts and rates of flow of air or other gas, are 120 cubic centimetres at the uniform rate of a cubic centimetre per second for 2 minutes, using a column of indicator material $3/4$ inch to $1 1/4$ inches in length in a cylindrical glass tube of $3/8$ inch bore. At 0° C., for concentration of 5 and 20 parts of carbon monoxide per 100,000 parts of air, the usual lengths of sepia coloured band to be measured are about $1/8$ inch and $1/4$ inch respectively, the lengths not being more than 10 per cent. greater or less at −20° C. or +20° C. respectively.

As the air or gases to be tested for carbon monoxide may contain appreciable amounts of other gases, vapours and the like which may affect the indicator material, it is usually necessary to remove these contaminants before the air or gas enters the column of indicator material. The most usual of these contaminants are readily condensible vapours of hydrocarbons, oils, organic solvents, and the like, in addition to moisture, nitrous fumes, and organic dusts. These are readily removable by passing the air or gas to be tested through activated silica gel or similar absorbent. The absorbent material is conveniently included in the indicator tube as a column in front of the indicator material. A column about 1½ inches in length of the aforementioned purified white silica gel, containing 15 per cent. of added water, as used for impregnation, is suitable for purification of the quantities of air or other gas passed through the indicator tube. Hydrogen and ethylene, in the amounts normally present in air or gases in which carbon monoxide is to be tested, do not affect the accuracy of the indication. Acetylene and hydrogen sulphide produce a colour change in the indicator material similar to that due to carbon monoxide, but are not usually present in air or other gases in sufficient quantity to affect carbon monoxide determinations.

The use of the aforementioned unimpregnated silica gel as a purifying agent for the air or other gases to be tested, has the advantage not only of being an efficient absorbent for impurities but, having the same moisture content (15 per cent.) as the indicator material, moisture equilibrium is automatically set up throughout the contents of the indicator tube. Its use also enables partitions of separating material such as gauzes and the like, between the absorbent and the indicator material, to be dispensed with. If the surface of the absorbent gel is made accurately level before the indicator material is filled on top of it, the sharp line of demarcation between the two types of gel marks clearly the position from which the length of colour band is to be measured in the determination of carbon monoxide.

The aforesaid indicator tubes can be used to determine carbon monoxide concentrations not only by measurement of the length of band of colour change in a fixed time, but also by measurement of the time for a fixed length of colour-changed band to be developed, the time to develop a band of any one particular length being inversely proportional to the concentration of carbon monoxide. This method is of great convenience in cases where the concentration of carbon monoxide is so high that the usual method would give a band length greater than the total length of the indicator material in the tube.

A simple form of apparatus for use of the material in accordance with the invention is illustrated in the accompanying drawing in which Fig. 1 is a sectional elevation and Fig. 2 is a sectional plan along the line II—II of Fig. 1.

Referring to the drawing a cylindrical tube 1 tapered at one end, contains a gauze cone 2 at the tapering end. Located above the cone 2 is a column 3 of indicator material in accordance with the invention, e. g. potassium palladosulphite deposited on silica gel, above which is located a column 4 of silica gel or other absorbent material to act as a protective layer for the indicator material. The layers 3 and 4 are held in place by a gauze disc 5 secured by a strip of spring steel 6 bent to be substantially M-shaped in cross-section (see Fig. 2). At the tapering end of the tube 1 a cylindrical extension 7 is provided and to this extension 7 is secured by a rubber tube 8 a thick walled glass or metal capillary tube 9. Attached to the capillary tube 9 is a further metal tube 10, the tubes 9 and 10 being connected by a rubber tube 11 and the tube 10 enters and is sealed in a rubber bulb 12, having reinforcements 13. In the wall of the tube 10 is provided a hole 14 which is surrounded by a rubber sleeve 15 which in consequence acts as a one way valve.

In operation the rubber bulb 12 is squeezed and the air expelled from the rubber bulb passes through the hole 14, the rubber sleeve 15 stretching to allow escape of this air. On releasing the bulb 12 the sleeve 15 tightens, sealing the hole 14, and air enters through the open end of the tube 1, the rate at which the air enters being restricted to a suitably low value by the capillary tube 9. The operation of squeezing and releasing the bulb 12 thus causes a standard quantity of air to be drawn at a slow controlled rate through the column of indicator material 3, and the existence of carbon monoxide in the air or other gas so drawn through the column 3 is indicated by a change in colour of the material in the column 3.

By measuring the length from the interface between the columns 3 and 4 along which the colour change in the column 3 is perceptible, the apparatus may be used for quantitative colour determination of the percentage of carbon monoxide in air or other gases by comparing said length with the length along which colour change is perceptible with gaseous mixtures of known carbon monoxide content.

We claim:

1. A material for the detection of carbon monoxide in admixture with other gases consisting of a relatively inert, absorbent carrier substance impregnated with a compound selected from the group consisting of palladium sulphite $PdSO_3$ and the palladosulphites of the formula $$M_2(Pd(SO_3)_2)_n$$

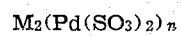

where M represents a metal having a valency of $n$, said material normally containing a substantial and uniformly distributed amount of water.

2. A material for the detection of carbon monoxide in admixture with other gases according to claim 1 wherein the carrier substance consists of silica gel and the moisture content of the material is approximately 15% by weight.

3. A material for the detection of carbon monoxide in admixture with other gases consisting of a relatively inert, absorbent carrier substance impregnated with a palladosulphite of the formula $M_2Pd(SO_3)_2$, where M represents an alkali metal, said material normally containing a substantial and uniformly distributed amount of water.

4. A material for the detection of carbon monoxide in admixture with other gases consisting of silica gel impregnated with a compound selected from the group consisting of palladium sulphite $PdSO_3$ and the palladosulphites of the formula $M_2(Pd(SO_3)_2)_n$ where M represents a metal having a valency of $n$, said material normally containing a substantial and uniformly distributed amount of water.

5. A material for the detection of carbon monoxide in admixture with other gases consisting of potassium palladosulphite in the form of a yellow solid product of formula $K_2Pd(SO_3)_2$ having the property of changing in colour on exposure to carbon monoxide.

6. An apparatus for the detection and quantitative estimation of carbon monoxide comprising a container having an inlet and an outlet for the gas under investigation, a mass of water-containing solid carrier substance impregnated with a compound having the property of changing colour on exposure to carbon monoxide, said compound being selected from the group consisting of palladium sulphite $PdSO_3$ and the palladosulphites of the formula $M_2(Pd(SO_3)_2)_n$ where M represents a metal having a valency of $n$, said mass being located in a well defined zone in said container between the inlet and outlet thereof, and a body of unimpregnated carrier substance having the same moisture content as the impregnated mass interposed between the latter and the inlet of the container and in abutting contact with said mass so as to provide a sharp line of demarcation from which to masure the colour change of said mass on exposure to carbon monoxide, said container having a wall through which the impregnated mass is visible.

JOHN DAVID MAIN-SMITH.
GEORGE ALAN EARWICKER.

REFERENCES CITED

The following references are of record in the file of this patent:

UNITED STATES PATENTS

| Number | Name | Date |
| --- | --- | --- |
| 1,321,062 | Lamb et al. | Nov. 4, 1919 |
| 1,971,668 | Wiedkrauck et al. | Aug. 28, 1934 |
| 2,111,301 | Schroter | Mar. 15, 1938 |
| 2,174,349 | Littlefield | Sept. 26, 1939 |
| 2,176,462 | McAllister | Oct. 17, 1939 |
| 2,375,786 | Haywood | May 15, 1945 |

OTHER REFERENCES

Roscoe and Schorlemmer, "Treatise on Chemistry," vol. 2, page 1316 (1907).

Mellor, "Comprehensive Treatise on Inorganic and Theoretical Chemistry," vol. 10, pages 320 to 326 (1930), Longmans, Green & Co., N. Y. C.

Browning, "Introduction to the Rarer Elements," pages 174, 175 (1914), John Wiley and Sons, N. Y. C.